United States Patent
Tanaka et al.

(10) Patent No.: US 8,582,277 B2
(45) Date of Patent: Nov. 12, 2013

(54) LAMINATED TYPE CERAMIC ELECTRONIC PARTS

(75) Inventors: Hirobumi Tanaka, Tokyo (JP); Makoto Endo, Tokyo (JP); Satoko Ueda, Tokyo (JP); Daisuke Ueda, Tokyo (JP); Shogo Murosawa, Tokyo (JP); Daisuke Yoshida, Tokyo (JP); Kenta Ono, Tokyo (JP); Minoru Ogasawara, Tokyo (JP); Tatsuya Kikuchi, Tokyo (JP)

(73) Assignee: TDK Corporation, Tokyo (JP)

( * ) Notice: Subject to any disclaimer, the term of this patent is extended or adjusted under 35 U.S.C. 154(b) by 58 days.

(21) Appl. No.: 13/300,952

(22) Filed: Nov. 21, 2011

(65) Prior Publication Data

US 2012/0162858 A1 Jun. 28, 2012

(30) Foreign Application Priority Data

Nov. 22, 2010 (JP) .................. 2010-260342
Nov. 25, 2010 (JP) .................. 2010-262774
Nov. 17, 2011 (JP) .................. 2011-251975

(51) Int. Cl.
*H01G 4/12* (2006.01)
*C04B 35/468* (2006.01)

(52) U.S. Cl.
USPC .......... 361/321.4; 501/136; 501/139

(58) Field of Classification Search
USPC .......... 501/134, 135, 136, 137, 138, 139; 361/321.4

See application file for complete search history.

(56) References Cited

U.S. PATENT DOCUMENTS

| 6,620,753 | B2 | 9/2003 | Nakamura et al. |
| 7,006,345 | B2 * | 2/2006 | Nakano et al. ............. 361/321.5 |
| 7,528,088 | B2 | 5/2009 | Umeda et al. |
| 7,638,451 | B2 * | 12/2009 | Inoue et al. .................. 501/138 |

FOREIGN PATENT DOCUMENTS

| JP | A-11-45617 | 2/1999 |
| JP | A-2001-240467 | 9/2001 |
| JP | A-2002-201065 | 7/2002 |
| JP | A-2002-270458 | 9/2002 |
| JP | A-2005-67981 | 3/2005 |
| JP | A-2005-223313 | 8/2005 |
| JP | A-2006-287045 | 10/2006 |
| JP | 2007258661 | * 10/2007 |

* cited by examiner

*Primary Examiner* — Karl Group
(74) *Attorney, Agent, or Firm* — Oliff & Berridge, PLC

(57) ABSTRACT

A multilayer ceramic electronic component comprising an element body in which a dielectric layer and an internal electrode layer are stacked. The dielectric layer is constituted from a dielectric ceramic composition including; a compound having a perovskite structure expressed by a formula of $ABO_3$ (A is at least one selected from Ba, Ca, and Sr; B is at least one selected from Ti, Zr, and Hf); an oxide of Mg; an oxide of rare earth elements including Sc and Y; and an oxide including Si. The dielectric ceramic composition comprises a plurality of dielectric particles and a grain boundary present in between the dielectric particles. In the grain boundary, when content ratios of Mg and Si are set to D(Mg) and D(Si) respectively, D(Mg) is 0.2 to 1.8 wt % in terms of MgO, and D(Si) is 0.4 to 8.0 wt % in terms of $SiO_2$.

11 Claims, 5 Drawing Sheets

LAMINATED TYPE CERAMIC ELECTRONIC PARTS

TECHNICAL FIELD

The present invention relate to a multilayer ceramic electronic component, and a multilayer ceramic electronic component which can improve dielectric characteristics (particularly, a specific permittivity and a temperature characteristic of a capacitance) regardless of a content of the component included in a dielectric ceramic composition constituting a dielectric layer.

BACKGROUND ART

Recently, as an electronic circuit has become highly densified, there are increasing demands to make an electronic component further compact and to obtain higher performance, and along with that, for example, a multilayer ceramic capacitor has become further compact and has larger capacity, yet further improvement of the characteristics is demanded.

In response to such demands, the improvement of the characteristics is realized by controlling the boundary structure, and by placing different phases other than the main component, in the dielectric ceramic composition constituting the dielectric layer.

For example, the patent document 1 describes the dielectric ceramic comprising $ABO_3$ as the main component, a rare earth element, M (Ni, Co, Fe, Cr, and Mn) and Si, wherein the rare earth element, M and Si are included at 70% or more of analysis points among the analysis points in the grain boundary. It also describes that this dielectric ceramic has long lifetime under high temperature high voltage load, and the small change of the capacitance over time under the DC voltage application.

However, the patent document 1 does not describe the specific content ratio of the above described elements, and the samples of the examples of the patent document 1 had a specific permittivity lower than that of the sample of the comparative example, thus there was problem that it cannot have larger capacity.

Also, the patent document 2 describes the electronic component wherein a ratio of particles with a thickness of grain boundaries of 1 nm or less is 30% or more and 95% or less.

Further, the patent document 3 describes the multilayer ceramic capacitor having a different phase including Mg—Si—O. Also, the patent document 4 describes the multilayer ceramic capacitor having the interfacial layer having an oxide of Ba—Ti—Si—Mg as the main component in between the ceramic layer and the internal electrode. Also, the patent document 5 describes the multilayer ceramic capacitor wherein Mn is segregated at the boundary between the dielectric layer and the internal electrode layer.

Also, as a different approach from the above, the patent document 6 examines to improve the specific permittivity by controlling the heat treatment condition during the firing. Specifically, during the step of firing the green multilayer body, for example the firing is carried out at 1100 to 1300° C. while suppressing the oxidation of the internal electrode layer under the reduced atmosphere having the oxygen partial pressure of $1 \times 10^{-9}$ Pa or less. Then, reoxidation treatment of the dielectric layer is carried out by carrying out the heat treatment at 1000 to 300° C. under the oxygen partial pressure of $1 \times 10^{-7}$ Pa or more.

However, there was a problem that the specific permittivity also declined when the dielectric layer becomes thinner, as well as the specific permittivity differed depending on the composition of the dielectric ceramic composition.

That is, according to the dielectric ceramic composition having the barium titanate as the main component in patent document 6, its specific permittivity was about 4900 at most when the thickness of the dielectric layer was 4 μm, and if the dielectric layer was made further thinner, the specific permittivity further declined.

Patent document 1: Japanese Patent Application Laid Open 2002-201065
Patent document 2: Japanese Patent Application Laid Open 2006-287045
Patent document 3: Japanese Patent Application Laid Open 2005-223313
Patent document 4: Japanese Patent Application Laid Open 2002-270458
Patent document 5: Japanese Patent Application Laid Open H11-45617
Patent document 6: Japanese Patent Application Laid Open 2001-240467

SUMMARY OF THE INVENTION

The present invention was accomplished reflecting such situations, an object is to provide a multilayer ceramic electronic component which can improve dielectric characteristics (particularly, a specific permittivity and a temperature characteristic of a capacitance) regardless of a content of the component included in a dielectric ceramic composition constituting a dielectric layer.

In order to accomplish above object, the multilayer ceramic electronic component according to the present invention is:

a multilayer ceramic electronic component comprising an element body in which a dielectric layer and an internal electrode layer are stacked, wherein said dielectric layer is constituted from a dielectric ceramic composition including; a compound having a perovskite type crystal structure expressed by a general formula of $ABO_3$, where A is at least one selected from a group consisting of Ba, Ca, and Sr; B is at least one selected from a group consisting of Ti, Zr, and Hf; an oxide of Mg; an oxide of R element, where R element is one selected from a group consisting of Sc, Y, La, Ce, Pr, Nd, Pm, Sm, Eu, Gd, Tb, Dy, Ho, Er, Tm, Yb, and Lu; and an oxide including Si, said dielectric ceramic composition comprises a plurality of dielectric particles and a grain boundary present in between said dielectric particles adjacent to each other, in said grain boundary, when a content ratio of said Mg is set to D(Mg) and a content ratio of said Si is set to D(Si), said D(Mg) is 0.2 to 1.8 wt % in terms of MgO, and said D(Si) is 0.4 to 8.0 wt % in terms of $SiO_2$.

Usually, in the dielectric layer after the firing, dielectric particles (main component particles), and grain boundaries formed therebetween are present. In the grain boundary, elements which could not dissolve or were difficult to dissolve into the main component particle during the firing are included. If such elements (for example, Si and Mg) which are included in the grain boundary are present in between the internal electrode layers (the dielectric layer), the dielectric characteristics tend to decline.

Thus, in the present invention, contents of the elements which affect the dielectric characteristics when being present in the grain boundary, are controlled to be within above described range. By doing so, a multilayer ceramic electronic component which can improve the dielectric characteristics (the specific permittivity and the temperature characteristic of the capacitance) can be obtained.

Preferably, said internal electrode layer includes Ni, and when a content ratio of said Ni in the grain boundary is set to D(Ni), said D(Ni) is more than 0 wt % and 1.5 wt % or less in terms of NiO.

Ni included in the internal electrode layer may diffuse into the dielectric layer during the heat treatment. Ni which has diffused into the dielectric layer hardly diffuse (solid dissolve) into the dielectric particle, thus most part of it tends to remain in the grain boundary. However, when Ni which remains in the grain boundary is too much, the grain boundary may deteriorate, thus a reliability such as the high temperature acceleration lifetime or so declines.

Thus, in the present invention, the content ratio of Ni in the grain boundary is controlled to be within the above range. By doing so, the multilayer ceramic electronic component with improved reliability can be obtained.

Preferably, said D(Mg) and said D(Si) satisfy a relation of D(Si)>D(Mg).

Preferably, said D(Mg), said D(Si) and said D(Ni) satisfy a relation of D(Si)>D(Mg)>D(Ni).

Preferably, when a content ratio of said R element in the grain boundary is set to D(R), D(Mg), said D(Si), said D(Ni) and said D(R) satisfy a relation of D(R)>D(Si)>D(Mg)>D(Ni).

By controlling the content ratios of said elements in the grain boundary as above mentioned, the effect of the present invention can be further enhanced.

Preferably, an average value of a thickness of said grain boundary is 0.3 to 0.9 nm, and a deviation of the thickness of said grain boundary is 25 or less in C.V. value.

Preferably, a segregation area having different composition than said dielectric particle is present in said dielectric layer, and at a cross section of said element body cut by a vertical plane to the dielectric layer and the internal electrode layer, a ratio of an area occupied by said segregation area with respect to an area of the cross section is 0.1 to 5.0%.

Preferably, said segregation area substantially consists of a composite oxide of said Mg and said Si.

Preferably, among said segregation areas, the number of a segregation area which contacts with said internal electrode layer is 20 to 100%.

Preferably, said element body comprises an electrode missing portion where said internal electrode layer is not formed in the area that said internal electrode layer should be formed, and said segregation area is present in at least part of said electrode missing portion.

By doing so, the effect of the present invention can be further enhanced.

DETAILED DESCRIPTION OF THE INVENTION

Hereinafter, the present invention will be described based on the embodiment shown in the figures.
(The Multilayer Ceramic Capacitor 1)

Figure 1:
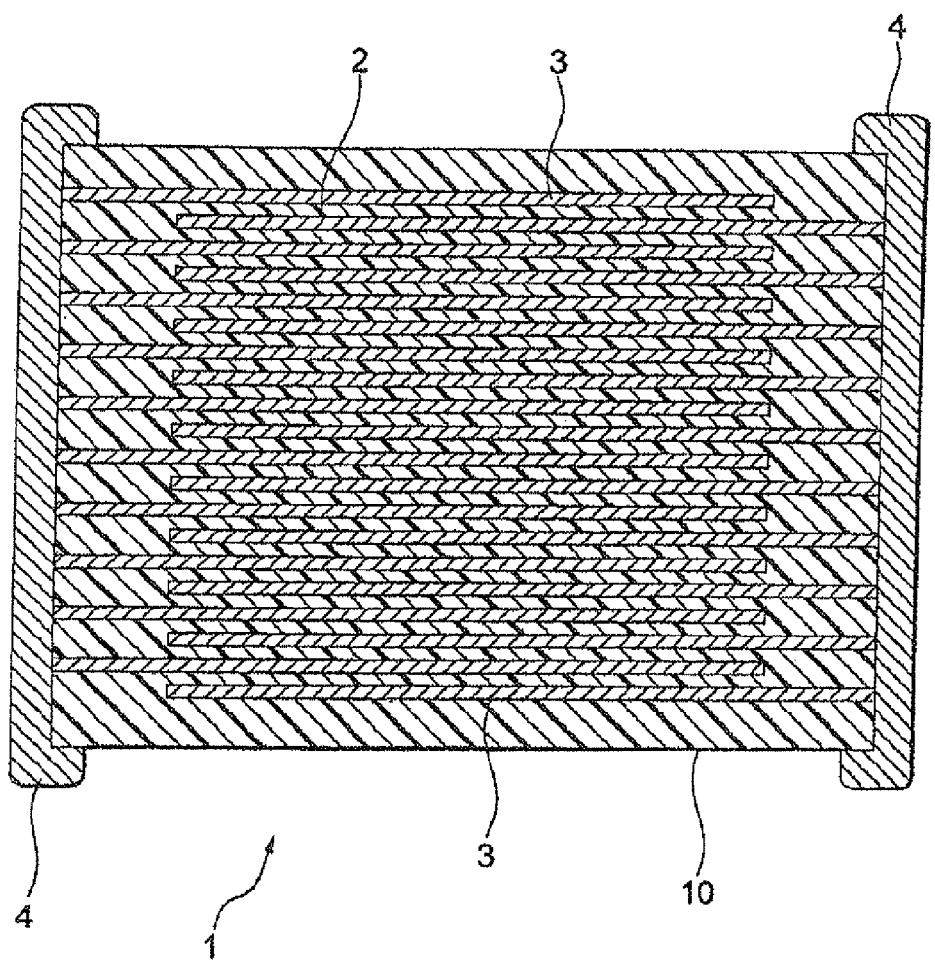
FIG. 1 shows the cross section of the multilayer ceramic capacitor according to an embodiment of the present invention.

As shown in FIG. 1, the multilayer ceramic capacitor 1 according to an embodiment of the present invention comprises a capacitor element body 10 constituted by stacking a dielectric layer 2 and an internal electrode 3 in alternating manners. At the both ends of this element body 10, a pair of external electrode 4 each electrically connected with the internal electrode arranged in alternating manner in the element body 10. The shape of the element body 10 is not particularly limited, however usually it is rectangular parallelepiped. Also, the size thereof is not particularly limited, and it may be suitable size depending of the use.
(The Dielectric Layer 2)

The dielectric layer 2 is constituted from the dielectric ceramic composition. The dielectric ceramic composition comprises a compound having a perovskite type crystal structure expressed by a general formula of $ABO_3$ (A is at least one selected from a group consisting of Ba, Ca, and Sr; B is at least one selected from a group consisting of Ti, Zr, and Hf), as a main component. Further, said dielectric ceramic composition comprises an oxide of Mg, an oxide of R element, and an oxide including Si as the subcomponents. Note that, the amount of oxygen (O) may slightly deviate from above mentioned chemical composition formula.

Said compound is expressed in the present embodiment by compositional formula of $(Ba_{1-x-y}Ca_xSr_y)TiO_3$. That is, the B site atom is constituted from Ti.

In the present embodiment, the B site atom is only Ti, however other element than Ti (for example, Zr and Hf or so) may be included in the B site atom as long as about the amount of impurities. In this case, if the content of the atom other than Ti is 0.3 atom % or less with respect to 100 atom % of B site atom, then it can be considered as the amount of impurities.

Also, the molar ratio between the A site atom (Ba, Sr, and Ca) and the B site atom (Ti) is expressed as A/B ratio, and in the present embodiment, A/B ratio is preferably 0.98 to 1.02. Note that, either "x" and "y" can be any arbitrary range, however it is preferably within the range described in below.

In the present embodiment, "x" in the above formula is preferably $0 \leq x \leq 0.5$. "x" represents the number of Ca atom, and by setting the "x" within said range, the capacitance temperature coefficient or the specific permittivity can be controlled. In the present embodiment, Ca does not necessary have to be included.

In the present embodiment, "y" in the above formula is preferably $0 \leq y \leq 0.5$. "y" represents the number of Sr atom, by setting the "y" within said range, the specific permittivity at room temperature can be improved. In the present embodiment, Sr does not necessary have to be included.

The content of the oxide of Mg may be determined depending on the desired characteristics, however it is preferably 0.2 to 2.5 mol in terms of MgO with respect to 100 mol of $ABO_3$. By including said oxide, the desired capacitance temperature characteristic and IR lifetime can be obtained.

The content of the oxide of R element may be determined depending on the desired characteristics, however it is preferably 0.2 to 2.5 mol in terms of $R_2O_3$ with respect to 100 mol of $ABO_3$. By including said oxide, the IR lifetime can be improved. R element is at least one selected from a group consisting of Sc, Y, La, Ce, Pr, Nd, Pm, Sm, Eu, Gd, Tb, Dy, Ho, Er, Tm, Yb, and Lu; and preferably it is at least one selected from the group consisting of Y, Dy, Gd, and Ho.

The content of the oxide including Si may be determined depending on the desired characteristics, however it is preferably 0.2 to 3.0 mol in terms of $SiO_2$ with respect to 100 mol of $ABO_3$. By including said oxide, mainly the sintering property of dielectric ceramic composition is improved. Note that, as for the oxide including Si, it may be composite oxide between Si and other metal element (for example, alkali metal or alkaline earth metal), however in the present embodiment, it is preferably (Ba, Ca)$SiO_3$ which is the composite oxide of Si, Ba and Ca.

Also, (Si/Mg) showing the ratio of the number of Si and the number of Mg which are included in the dielectric ceramic composition is preferably smaller than 0.5.

In the present embodiment, above mentioned dielectric ceramic composition may further have other subcomponents depending on the desired characteristics.

For example, in the dielectric ceramic composition according to the present invention, an oxide of Mn and/or Cr may be included. The content of said oxide is preferably 0.02 to 0.30 mol in terms of each oxides with respect to 100 mol of $ABO_3$.

Also, in the dielectric ceramic composition according to the present invention, an oxide of at least one element selected from the group consisting of V, Ta, Nb, Mo and W may be included. The content of said oxides is preferably 0.02 to 0.30 mol in terms of each oxide with respect to 100 mol of $ABO_3$.

The thickness of the dielectric layer 2 may be determined depending on the desired characteristic or the use, however it is preferably 3 µm or less, and further preferably 2 µm or less, and particularly preferably 1 µm or less. Also, the stacked number of the dielectric layer 2 is not particularly limited, however it is preferably 20 or more, more preferably 50 or more, and particularly preferably 100 or more.

(The Dielectric Particle and the Grain Boundary)

Figure 2:
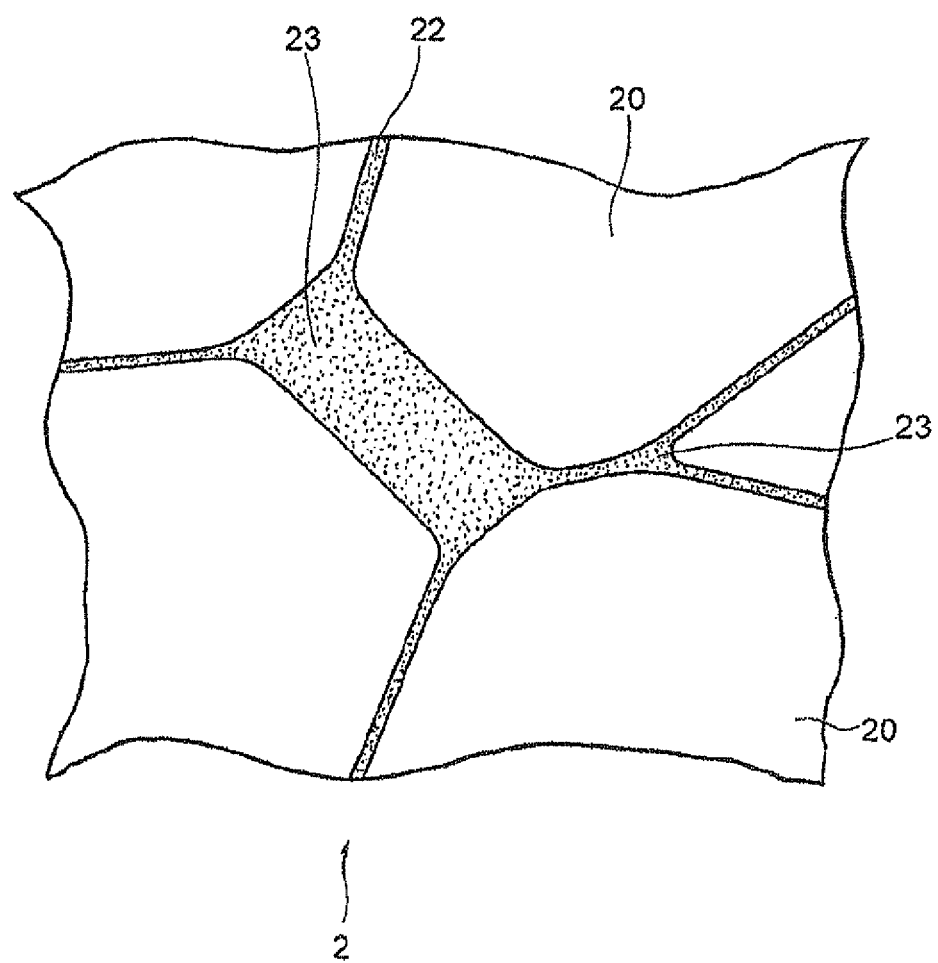
FIG. 2 is enlarged cross section of main portion of the dielectric layer 2 shown in FIG. 1.

As shown in FIG. 2, the dielectric layer 2 includes the dielectric particle 20, and the grain boundary 22 formed between a plurality of dielectric particles 20 adjacent to each other. In the present embodiment, the dielectric particle 20 may be a particle in which the subcomponent element such as R element, Mg or Si or so formed solid solution (diffused) with the main component particle ($ABO_3$ particle).

The grain particle diameter of the dielectric particle 20 is for example measured as described in below. That is, the element body 10 is cut in the stacking direction of the dielectric layer 2 and the internal electrode layer 3, and the average area of the dielectric particle is measured at the cross section thereof, then the diameter is calculated as an equivalent circle diameter and the grain particle diameter is a value obtained by multiplying the diameter by 1.27. The grain particle diameter is measured to 200 or more of the dielectric particles, the average grain particle diameter (unit: µm) may be defined as the value having cumulative frequency of 50% based on a cumulative frequency distribution of the obtained grain particle diameters. Note that, the grain particle diameter may be determined depending on the thickness of the dielectric layer 2.

The grain boundary 22 is mainly constituted from the oxide of the element included in the dielectric layer, however the boundary may include the oxide of element which is mixed as the impurities during the production steps or the oxide of the element constituting the internal electrode layer. Also, the grain boundary 22 is mainly constituted from the amorphous state, however it may be constituted from crystal state.

In the present embodiment, at least Mg and Si are controlled to be included in the grain boundary 22 in particular ratio, and further the R element and Ni are also controlled to be included in a particular ratio.

Specifically, when the content ratio of Si in the grain boundary 22 is set to D(Si), then D(Si) is 0.4 to 8.0 wt %, more preferably 1.0 to 6.0 wt % in terms of $SiO_2$. Also, when the content ratio of Mg in the grain boundary is set to D(Mg), then D(Mg) is 0.2 to 1.8 wt %, and more preferably 0.2 to 1.2 wt % in terms of MgO.

Usually, Si is less likely to diffuse into the dielectric particle 20, and tends to remain in the grain boundary 22, Mg tends to diffuse into the dielectric particle 20 compared to Si. However, if Mg and Si are present in the grain boundary 22, then for example the specific permittivity declines. Also, if Mg is excessively solid-soluted in the dielectric particle 20, for example the temperature characteristic is deteriorated.

Thus, in the present embodiment, the presence of Si and Mg in the grain boundary 22 is controlled so that the D(Si) and D(Mg) simultaneously satisfy the above range. As a result, the specific permittivity is improved and further superior temperature characteristic of the capacitance can be obtained.

Also, when the content ratio of Ni in the grain boundary 22 is set as D(Ni), then D(Ni) is preferably larger than 0 wt % and 1.5 wt % or less, and more preferably 0.1 to 1.5 wt % in terms of NiO. When the internal electrode 3 is constituted by the conductive material including Ni, it may diffuse into the dielectric layer 2 during the heat treatment step or so. However, Ni hardly forms solid solution with the dielectric particle 20, and tends to remain in grain boundary 22. Also, when the oxide of Ni is included as the subcomponent, Ni tends to remain in the grain boundary 22.

In the present embodiment, the presence of Ni in the grain boundary 22 is controlled so that the content ratio of Ni in the grain boundary 22 is within said range. By doing so, the oxygen deficiencies of the dielectric ceramic composition are compensated, and further the deterioration of the grain boundary due to the presence of many Ni in the grain boundary can be prevented. As a result, the reliability (IR lifetime) of the multilayer ceramic electronic component can be improved.

Further, when the content ratio of the R element in the grain boundary 22 is set to D(R), it is preferable to satisfy the relation of D(R)>D(Si)>D(Mg)>D(Ni). By satisfying the relation of the content ratio of each element as mentioned in the above, the above mentioned effects can be further be enhanced. Note that, the upper limit and the lower limit of the D(R) is not particularly limited, and can be changed within the range which satisfies the above range depending on the desired characteristics, however it is preferably 3.0 wt % or more in terms of $R_2O_3$.

As the method for measuring the content ratio of Mg, Si, Ni and R element in the grain boundary 22, it is not particularly limited, and for example, it may be measured as described in below.

In the present embodiment, the dielectric particle 20 and the grain boundary 22 are identified by observing the dielectric layer 2 using the scanning transmission electronic microscope (STEM), and further using the energy dispersive X-ray spectroscopy (EDS) equipped with the STEM, the point analysis in the grain boundary 22 is carried out to calculate the content ratio of each element in the grain boundary 22.

Specifically, the cross section of the dielectric layer 2 is observed by STEM to obtain the bright field (BF) image. The grain boundary 22 is defined as an area which is present between the dielectric particles 20 in this bright field image and has a different contrast than said dielectric particles 20.

Whether the area has the different contrast or not may be determined by visual observation or by carrying out the image processing by software.

Next, by using the EDS, the point analysis is carried out in the area determined as the grain boundary 22. At this moment, the measurement condition such as the beam diameter, the acceleration voltage, the CL diaphragm or so are controlled so that the information of the element included in the area other than the grain boundary for example the dielectric particle or so, are detected. Note that, the numbers of the measurement points are not particularly limited, but it is preferably 10 points or more.

For example, the content ratio of Mg is defined as the weight ratio in terms of MgO when the content ratio of all elements detected in the measurement point is converted in terms of oxides, and the total thereof is set to 100 wt %. Then, the average of the content ratio of Mg in each measurement point is calculated, and this value is set as the content ratio of Mg in the grain boundary. The same holds true for other elements.

In the present embodiment, the average of the measurement of the thickness of the grain boundary 22 is preferably 0.3 to 0.9 nm, and more preferably 0.3 to 0.7 nm. When a C.V. value is calculated which is the indication showing the variation of the grain boundary 22 obtained from the standard deviation of the grain boundary thickness and the average thickness of the grain boundary 22, the C.V. value is preferably 25 or less, and more preferably 20 or less. Note that, the C.V value is obtained as below.

$$C.V. \text{ value} = (\text{standard deviation/average}) \times 100$$

By controlling the average value of the grain boundary thickness 22 and suppressing the deviation thereof, the reliability can be further improved.

As for the method for measuring the thickness of the grain boundary 22, it is not particularly limited, however the same method for measuring the content ratio of the element in the grain boundary 22 can be applied as well. That is, the grain boundary 22 is defined as the area which is present in between the dielectric particles 20 in the bright field (BF) image of the STEM in the cross section of the dielectric layer and has a contrast different from the dielectric particle 20; then the thickness may be measured by visual observation or by image processing using the software. Next, the average value is obtained from the thickness values of the grain boundary in each measurement point, and it is set to an average value of the grain boundary thickness. Note that, the number of the grain boundary 22 to be measured is not particularly limited, however it is preferably 10 points or more.

Note that, in the present embodiment, the grain boundary is defined as the border area present between the two particles. Thus, the thickness or the content ratio of the element in the area 23 (triple point or so) present among three particles or more are not considered in the thickness or the content ratio of the element described in above.

(The Segregation Area)

Figure 3:
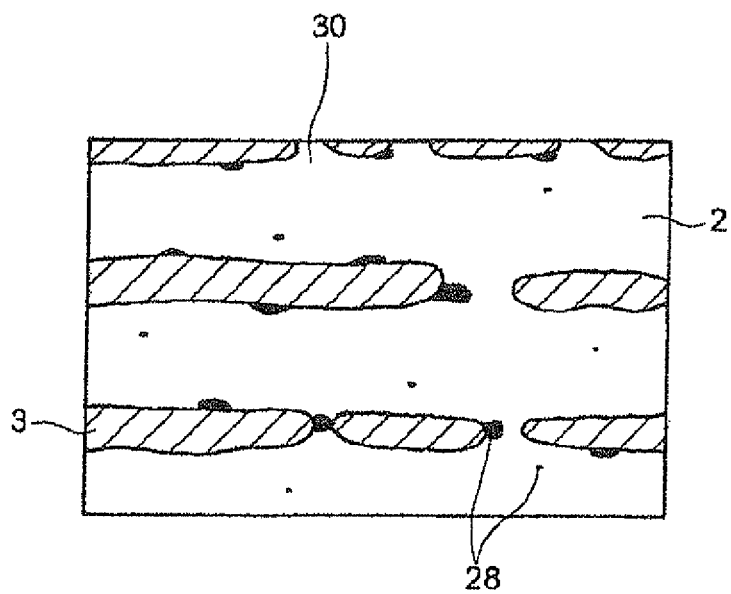
FIG. 3 is enlarged cross section of main portion of the element body 10 shown in FIG. 1.

In the present embodiment, as shown in FIG. 3, in the dielectric layer 2, the segregation area 28 is present of which different from the composition of the dielectric particle 20 and the internal electrode layer 3.

As the component constituting the segregation area 28 shown in FIG. 3, it is not particularly limited, however in the present embodiment, Mg and Si are preferably included. In this case, the content of Mg and Si is preferably 60 wt % or more when the entire segregation area 28 is 100 wt %. Also, in the segregation area 28, other elements than Mg and Si may be included.

Further, the segregation area 28 is preferably constituted from the composite oxide substantially of Mg—Si—O type. The content of ratio of MgO and $SiO_2$ in said composite oxide is preferably, in mole ratio, $MgO:SiO_2=0.8:1.2$ to $1.2:0.8$. Also, MgO and $SiO_2$ are preferably included in almost 1:1.

Also, in regards with the cross section of the element body 10 cut by a vertical plane to the dielectric layer 2 and the internal electrode layer 3, the area ratio of the observed segregated area is preferably 0.1 to 5.0%, and more preferably 0.15 to 3.0% with respect to 100% of the entire cross section of the element body 10, By controlling the area ratio of the segregation area within the above range, the dielectric loss (tan δ) can be made superior.

Note that, as the observation method of the segregation area 28 in the cross section, it is not particularly limited as long as the segregation area 28 is observed in the entire cross section of the element body 10. For example, the observation may be performed in divided several visual fields, however it is preferable that the observation is performed in divided several fields, particularly divided 5 or more visual fields, considering the measurement accuracy and the deviation.

In the present embodiment, the area ratio of the segregation area 28 is defined as the average value of the area ratios obtained by measuring 5 visual fields of the cross section of the element body 10 at a magnification of 7000×. The area ratio of the segregation area 28 obtained by measuring 5 visual fields or more in such magnification is confirmed to almost match the area ratio of the segregation area 28 obtained by observing the entire cross section of the element body 10.

Also, in regards with the magnification, it is not particularly limited and may be set accordingly, however it is preferable to set a magnification so that at least one pair of internal electrodes are included in 1 visual field. By setting to such magnifications, it is possible to observe a ratio of particles which contact with the internal electrode as well as the area ratio.

As for the method for calculating the area ratio of the segregation area 28, it is not particularly limited; however, in the above visual field, it is preferable to set the segregation area 28 as the area having a different contrast than dielectric layer 2 and the internal electrode layer 3, and the area ratio thereof is calculated by visual observation or the software performing the image processing.

Note that, the segregation area 28 is thought to be an area where the elements (Mg, Si, and other elements) grow by segregating in a triple point, as described hereinafter, thus it is difficult to differentiate between grain boundary 22 and the segregation area 28 by difference of contrast.

However, when calculating the area ratio of the segregation area 28, since it is observed at a low magnification of 7000×, the resolution is 14.2 nm per 1 pixel thus it is impossible to recognize in the visual field the grain boundary 22 having a thickness lower than 1 nm. Therefore, even if the area ratio of the segregation area 28 is calculated as described in the above, the area of the grain boundary 22 is not included in the area ratio of the segregation area 28.

Also, composition of the segregation area 28 is usually different from the composition of the grain boundary 22, but it may be the same as well.

In the present embodiment, when the number of the segregation area 28 present in the dielectric layer 2 is set to 100%, then the segregation area 28 contacting with the internal electrode layer 3 is 20 to 100%, and more preferably 50 to 100% in terms of a ratio of the number. As shown in FIG. 3, as the segregation area 28 is in contact with the internal electrode layer 3, the strength of the boundary between the internal electrode layer 3 and the dielectric layer 2 is further enhanced. As a result, by setting the number of segregation area 28 contacting with the internal electrode layer 3 within the range of above said range, the cracks can be prevented even under severe condition (for example, after high temperature acceleration lifetime test).

As the method for calculating the ratio of the segregation area which contacts with the internal electrode layer, the method used when calculating the area ratio of the segregation area can be applied as well. That is, it may be calculated from the number of the segregation area 28 and the number of the segregation area 28 contacting with the internal electrode layer 3 observed in the visual field at a magnification of 7000× in the element body 10.

(The Internal Electrode Layer 3)

The conductive material included in the internal electrode layer 3 is not particularly limited, however in the present embodiment; Ni and Ni alloy are preferable. As the Ni alloy, an alloy of Ni and the element of one or more selected from Mn, Cr, Co and Al is preferable, and the Ni content in the alloy is preferably 95 wt % or more. Note that, in Ni or Ni alloy, various minor components such as P or so may be included in 0.1 wt % or less or so. The thickness of the internal electrode layer 3 may be determined appropriately depending on the use or so.

When the internal electrode layer 3 is enlarged, usually, as shown in FIG. 3, there is a portion where the internal electrode is not formed (the electrode missing portion 30) at a portion where the internal electrode should be formed. This electrode missing portion 30 is an area where conductive material is missing since the conductive material particle (mainly Ni particle) balls up due to the particle growth during the sintering, with the result that the conductive material particles adjacent to each other became apart to each other.

In the cross section shown in FIG. 3, due to this electrode missing portion 30, the internal electrode layer 3 appears to be discontinuous; however the electrode missing portions 30 are dotted in the main face of the internal electrode layer 3. Therefore, even if the internal electrode layer 3 seems to be discontinuous at the cross section shown in FIG. 3, it is continuous in other cross section, and the conductivity of the internal electrode layer 3 is ensured.

In the present embodiment, the segregation area 28 is preferably formed on at least a part of the electrode missing portion 30.

When a component (for example Mg or Si) which is different from the main component is included in the segregation area 28, said area tends to have deteriorated dielectric characteristics than the dielectric characteristics (specific permittivity or so) that the dielectric particle shows. Therefore, when the segregation area 28 is present in the dielectric layer 2 (in between the internal electrode layers 3); then as a result the dielectric characteristic of the multilayer ceramic electronic component may be deteriorated.

Thus, the segregation area 28 is controlled to be present in the electrode missing portion 30 present on the same face as the internal electrode layer 3, rather than in between the internal electrode layers 3. By doing so, a superior dielectric characteristic can be obtained.

Note that, the segregation area 28 does not necessary have to be formed such that it entirely covers the electrode missing portion 30, and the space may be present in between the internal electrode layer 3 and the segregation area 28.

(The External Electrode 4)

The conductive material included in the external electrode 4 is not particularly limited, and in the present invention, inexpensive Ni, Cu and the alloy thereof can be used. The thickness of the external electrode 4 may be determined appropriately depending on the use or so.

(The Method for Producing the Multilayer Ceramic Capacitor 1)

The multilayer ceramic capacitor 1 of the present embodiment is produced, as same as the conventional multilayer ceramic capacitor, by making the green chip by a usual printing method or a sheet method using the paste, then it is fired, and the electrode is baked by printing or transferring the external electrode. Hereinafter, the production method will be described specifically.

First, a dielectric material for forming the dielectric layer is prepared, and it is made into paste to prepare the dielectric layer paste.

As the dielectric materials, first, a material of $ABO_3$, a material of the oxide of Mg, a material of the oxide of R, and a material of the oxide including Si are prepared. As the materials of these, the oxide of above mentioned component or the mixture thereof, and the composite oxide thereof can be used. Also, it may be suitably selected from various compounds which become the above mentioned oxide or composite oxide by firing, and these may be mixed for use. As various compound, for example, carbonate, oxalate, nitrate, hydroxide, and organometallic compound or so may be mentioned.

Note that, as the material of $ABO_3$, those which are produced by various method such as so called solid phase method, and various liquid phase method (for example, the oxalate method, the hydrothermal synthesis method, the alkoxide method, the sol-gel method or so) may be used.

Further, when a component other than above mentioned main component and subcomponents are included, then as the material of said component, as similar to the above, the oxides of these components and mixture thereof, and composite oxide may be used. Also, various compounds which become the above oxide or the composite oxide by firing can be used.

The content of each component in the dielectric materials may be determined so that the composition becomes the above mentioned dielectric ceramic composition after firing. The particle diameter of the dielectric materials before made into the paste, is usually the average particle diameter of 0.1 to 1 µm or so.

The dielectric particle layer paste may be an organic paste wherein the dielectric materials and an organic vehicle are kneaded, or it may be a water based paste.

The organic vehicle is obtained by dissolving the binder in the organic solvent. As the binder it is not particularly limited, and it may be selected from various usual binders such as ethylcellulose, polyvinylbutylal or so. Also, as the organic solvent it is not particularly limited, and depending on the printing method or the sheet method or so, it may be suitably selected from various organic solvent such as terpineol, butylcarbitol, acetone, toluene or so.

Also, when the water based paste is used as the dielectric layer paste, the dielectric materials and a water based vehicle obtained by dissolving a water soluble binder and a dispersing agent in water may be kneaded. As the water soluble binder it is not particularly limited, and for example polyvinylalcohol, cellulose, water soluble acrylic resin or so may be used.

The internal electrode layer paste may be prepared by kneading the conductive material including above described Ni or Ni alloy, or various oxides including above described Ni or Ni alloy by firing, the organometallic compound, resinate or so and the organic vehicle. Also, an inhibitor may be included in the internal electrode layer paste. As for the inhibitor, it is not particularly limited, and it is preferable to have the same composition as the main component.

The external electrode layer paste may be prepared as same as the above described internal electrode layer paste.

As for the content of the organic vehicle in the above described each paste, it is not particularly limited, and usual content, for example, the binder is 1 to 5 wt % or so, and the solvent is 10 to 50 wt % or so. Also, in each paste, additives selected from various dispersing agents, plasticizers, dielectrics, and insulator or so may be added depending on the needs. The total content thereof is preferably 10 wt % or less.

When using the printing method, the dielectric layer paste and the internal electrode layer paste are printed on the substrate such as the PET or so, and stacked, then cut into predetermined shape to form the green chip by removing from the substrate.

Also, when using the sheet method, the green sheet is formed by using the dielectric layer paste, and the internal electrode layer is printed thereon, then it is stacked and the green chip is formed by cutting into predetermined shape.

Before firing, the binder removal treatment is carried out to the green chip. As for the binder removal condition, the temperature rising rate is preferably 5 to 300° C./hour, the holding temperature is 180 to 400° C., and the temperature holding time is 0.5 to 24 hours. Also, the atmosphere during the binder removal treatment is air or the reduced atmosphere.

Figure 4:
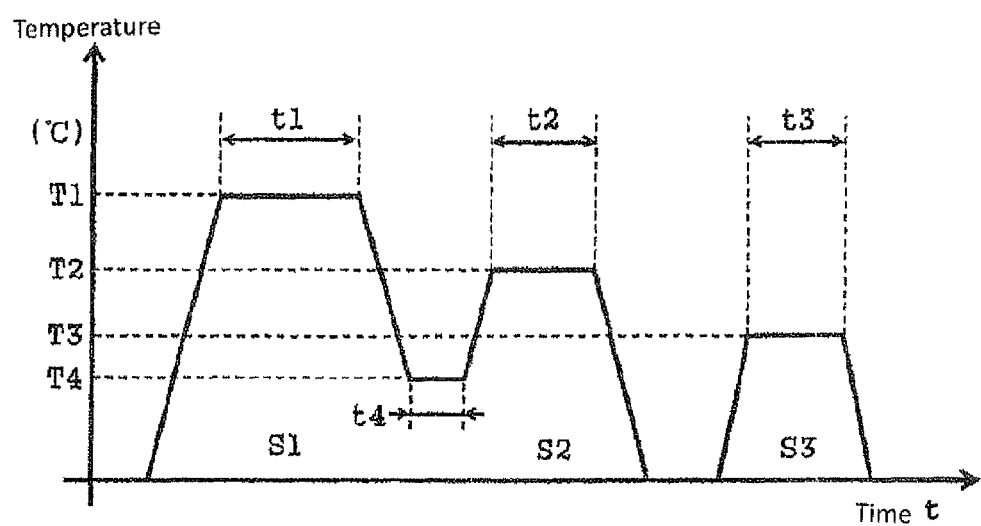
FIG. 4 is a graph showing the heat treatment condition during the production method of the multilayer ceramic capacitor according to an embodiment of the present invention.

After the binder removal treatment, the green chip is fired. In the present embodiment, as shown in FIG. 4, the firing step is preferably constituted from the first heat treatment step S1, the second heat treatment step S2, the third heat treatment step S3. During the heat treatment step S1, the temperature rising rate is preferably 200° C./hour or more. The first holding temperature T1 in the first heat treatment step S1 is preferably 1100 to 1300° C., and the first holding time t1 is not particularly limited, and it can be extremely short, but it is preferably 0.1 to 4 hours, and more preferably 0.5 to 2 hours.

The atmosphere during the first heat treatment step S1 is preferably reduced atmosphere, and as for the atmospheric gas, for example a mixed gas of $N_2$ and $H_2$ can be used by wetting. Also, the first oxygen partial pressure (1st $PO_2$) during the first heat treatment step S1 can be determined suitably depending on the type of the conductive material in the internal electrode layer paste, however when a base metal such as Ni and Ni alloy or so are used as the conductive material, the 1st $PO_2$ in the atmosphere is preferably $1.0\times10^{-8}$ to $1.0\times10^{-2}$ Pa. The temperature decreasing rate is preferably 50° C./hour or more.

In the present embodiment, the second heat treatment step S2 is carried out at the second holding temperature T2 lower than the first holding temperature T1 in the first heat treatment step S1 with the second oxygen partial pressure (2nd $PO_2$) lower than the 1st $PO_2$.

Specifically, the second holding temperature T2 during the second heat treatment step S2 is preferably higher than 1000° C. and 1200° C. or lower, and more preferably 1010 to 1200° C., particularly preferably 1030 to 1150° C. The second holding temperature time t2 during the second heat treatment step S2 is not particularly limited, and it may be extremely short; however it is preferably longer than the first holding time t1, more preferably it is longer than two times of the first holding time t1 and it is preferably 5 to 250 hours. The temperature rising rate in the second heat treatment step S2 is preferably 200° C./hour or more and the temperature decreasing rate is 50° C./hour or more.

Also, the atmosphere during the second heat treatment step S2 is preferably reduced atmosphere, and for the atmospheric gas, for example a mixed gas of $N_2$ and $H_2$ can be used by wetting. The second oxygen partial pressure (2nd $PO_2$) during the second heat treatment step S2 is preferably lower than the 1st $PO_2$ and $10^{-10}$ to $10^{-7}$ Pa; and the partial pressure condition and the wetting condition of $N_2$ and $H_2$ different from that of the first heat treatment step S1 is preferably selected.

In the present embodiment, the third heat treatment step S3 is carried out to the element body after the second heat treatment step S2. The third holding temperature T3 during the third heat treatment step S3 is preferably lower than the temperature of the second holding temperature T2, and preferably it is 650 to 1100° C., more preferably 760 to 1100° C., and particularly preferably 810 to 1060° C. The third holding time t3 during the third heat treatment step S3 is preferably 0.5 to 4 hours. Also, the atmosphere during the third heat treatment step S3 is preferably wet $N_2$ gas, and the third oxygen partial pressure (3rd $PO_2$) is higher than the 1st $PO_2$ and preferably it is $1.0\times10^{-3}$ to $1.0$ Pa, more preferably $1.0\times10^{-3}$ to $5\times10^{-1}$ Pa.

During the above mentioned binder removal treatment, the first heat treatment, the second heat treatment and the third heat treatment, when wetting the $N_2$ gas or the mixed gas or so, the wetter or so may be used. In this case, the water temperature is preferably 5 to 75° C. or so.

The binder removal treatment, the first heat treatment, the second heat treatment, the third heat treatment may be carried out continuously or they may be carried out independently. For example, as shown in FIG. 4, the fourth holding temperature T4 lower than the first holding temperature T1 and the second holding temperature T2 may be provided in between the first heat treatment step S1 and the second heat treatment S2, and the fourth holding temperature T4 is preferably 900° C. or less. The fourth holding time t4 at the fourth holding temperature T4 may be only an instant and it is not particularly limited; however it is preferably 0.1 to 1 hour.

At the heat treatment step as shown in FIG. 4, by carrying out the second heat treatment step S2 and the third heat treatment step S3 in different furnaces, these two steps are separated. Also, as shown in FIG. 5, by carrying out the first heat treatment step S1, the second heat treatment step S2, and the third heat treatment step S3 in the different furnaces, these steps may be separated.

Other than the above mentioned, as an example different from the heat treatment step shown in FIG. 4, it may be constituted so that a transition from the first heat treatment step S1 to the second heat treatment step S2 takes place continuously at the moment when the temperature reaches the second holding temperature T2 during the temperature decreasing part in the first heat treatment step S1. Also, as a different example from the heat treatment step shown in FIG. 4, it may be constituted so that a transition from the second heat treatment step S2 to the third heat treatment step S3 takes place continuously at the moment when the temperature reaches the third holding temperature T3 during the temperature decreasing part in the second heat treatment step S2; thereby the first heat treatment step S1, the second heat treatment step S2, and the third heat treatment step S3 may be carried out continuously.

Figure 5:
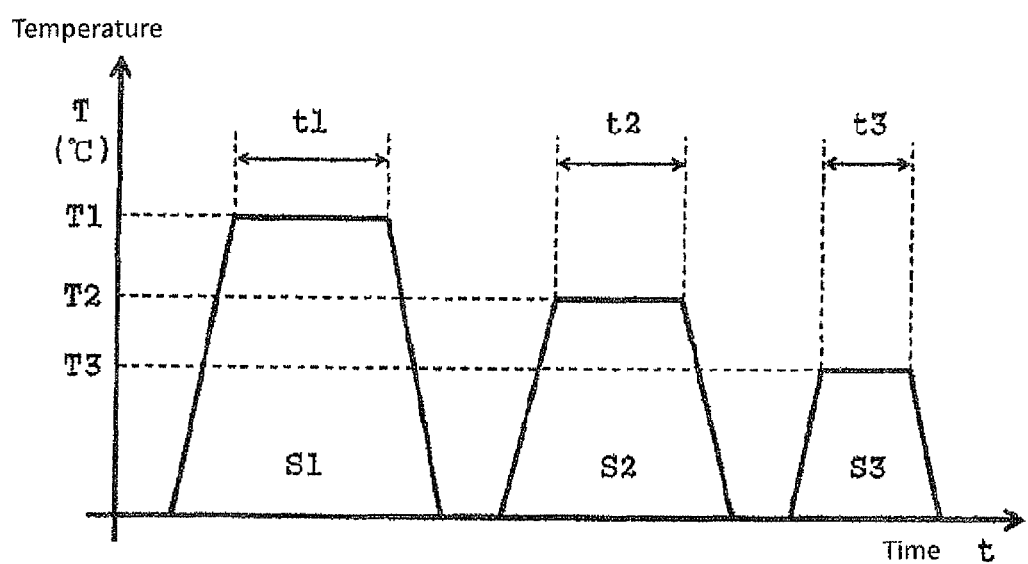
FIG. 5 is a graph showing the heat treatment condition different from the heat treatment condition shown in FIG. 4.

Alternatively, as a different example from the heat treatment step shown FIG. 5, it may be constituted so that a transition from the second heat treatment step S2 to the third heat treatment step S3 takes place continuously at the moment when the temperature reaches the third holding temperature T3 during the temperature decreasing part in the second heat treatment step S2.

By controlling the heat treatment as described in the above, the content ratio of each element in the grain boundary, the thickness of the grain boundary, and the presence of the segregation area can be easily controlled to a desired condition. As a result, the multilayer ceramic electronic component showing superior dielectric characteristics can be obtained regardless of the content of the oxides of Mg, Si, R in the dielectric ceramic composition.

To the capacitor element body obtained by above is performed with end surface grinding by, for example, barrel grinding and a sandblast or so and the external electrode layer paste is pasted and baked thereby the external electrode is formed. Then, depending on the needs, the covering layer is formed by plating or so to the surface of the external electrode 4.

The multilayer ceramic capacitor of the present embodiment produced thereby is mounted on the print substrate or so by soldering or so and used in various electronic components or so.

Hereinabove, the embodiment of the present invention was explained as described in the above, however the present invention is not to be limited thereto and it may be modified within the range which does not exceed the scope of the present invention.

In the embodiment described in the above, the multilayer ceramic capacitor is used as an example of the multilayer ceramic electronic component according to the present invention, however as the multilayer ceramic electronic component according to the present invention, it is not limited to the multilayer ceramic capacitor and it can be any electronic component which has the above described constitution.

EXAMPLES

Hereinafter, the present invention will be explained based on the detailed example; however the present invention is not limited to these examples.

(Experiment 1)

First, $BaTiO_3$ powder was prepared as the material of $ABO_3$ which is the main component. Also, as the material of the subcomponent, $MgCO_3$ powder as the material of the oxide of Mg, $R_2O_3$ powder as the material of the oxide of the R element, $(Ba_{0.6}Ca_{0.4})SiO_3$ powder (hereinafter referred as BCG) as the material of the oxide including the Si, MnO powder as the material of the oxide of Mn, $V_2O_5$ powder as the material of the oxide of V were prepared. Note that, $MgCO_3$ will be included in the dielectric ceramic composition as MgO after firing.

Next, $BaTiO_3$ powder (average particle diameter: 0.3 μm) prepared in the above and the material of the subcomponents were wet pulverized for 15 hours in the ballmill, and dried to obtain the dielectric material. Note that, the added amount of each subcomponent is 2.0 mol of MgO, 1.0 mol of $Y_2O_3$, 0.9 mol of BCG, 0.1 mol of MnO, 0.1 mol of $V_2O_5$ in terms of each oxides with respect to 100 mol of $BaTiO_3$ as the main component in the dielectric ceramic composition after firing.

Next, the obtained dielectric material: 100 parts by weight, polyvinylbutyral resin: 10 parts by weight, dioctylphthalate (DOP) as the plasticizer: 5 parts by weight, alcohol as the solvent: 100 parts by weight were mixed in the ballmill and made into paste to obtain the dielectric layer paste.

Also, Ni powder: 44.6 parts by weight, terpineol: 52 parts by weight, ethylcellulose: 3 parts by weight, and benzotriazole: 0.4 parts by weight were kneaded by triperoll and made into slurry to produce the internal electrode layer paste.

Then, by using the dielectric layer paste produced in the above, the green sheet was formed on the PET film. Next, on said green sheet, by using the internal electrode layer paste, the electrode layer was printed in a predetermined pattern, then the sheet was removed from the PET film, and the green sheet having the electrode layer was produced. Next, plurality of the green sheets having the electrode layers were stacked, the green multilayer body was made by press adhering. By cutting this green multilayer body into predetermined size, the green chip was obtained.

Next, the obtained green chip was carried out with the binder removal treatment and the heat treatment under the below described condition, and the element body as the sintered body was obtained.

The binder removal treatment condition was, the temperature rising rate: 15° C./hour, the holding temperature: 280° C., the temperature holding time: 8 hours, and the atmosphere: air.

In the first heat treatment step S1, the condition was; the temperature rising rate: 200 to 2000° C./hour, the first holding temperature T1: 1200 to 1300° C., the first holding time t1: 0.5 to 2 hours, the temperature decreasing rate: 200 to 2000° C./hour, the atmospheric gas: wet $N_2+H_2$ mixed gas (the first oxygen partial pressure (1st $PO_2$) was $1.0\times10^{-8}$ to $1.0\times10^{-2}$ Pa).

In the second heat treatment step, the condition was; the temperature rising rate: 200° C./hour, the second holding temperature T2: 1000 to 1200° C., the second holding time t2: 100 hours, the temperature decreasing rate: 200° C./hour, the atmospheric gas: wet $N_2+H_2$ mixed gas (the second oxygen partial pressure (2nd $PO_2$) was $1.0\times10^{-11}$ to $1.0\times10^{-6}$ Pa).

In the third heat treatment step S3, the condition was; the temperature rising rate: 200° C./hour, the third holding temperature T3: 1000° C., the third holding time t3: 2 hours, the temperature decreasing rate: 200° C./hour, the atmospheric gas: wet $N_2$ gas (the second oxygen partial pressure (3rd $PO_2$) was $1.0\times10^{-3}$ Pa).

Note that, for wetting the atmospheric gas during the first to third heat treatments, the wetter was used.

Next, after blushing the end face of the obtained element body by sandblast, Cu as the external electrode was pasted, and the sample of the multilayer ceramic capacitor as shown in FIG. 1 was obtained. The size of the obtained capacitor sample was 1.0 mm×0.5 mm×0.5 mm, and the dielectric layer thickness was 1.0 μm, and the internal electrode layer thickness was 1.0 μm. Also, the numbers of the dielectric layers sandwiched by the internal electrode layers were 200.

In regards with the obtained capacitor samples, the content ratio of Mg and Si in the grain boundary, the specific permittivity, and the temperature characteristic of the capacitance were measured by the method shown in the following.

(The Content Ratio of Mg and Si in the Grain Boundary)

First, the capacitor sample was cut in a vertical plane to the dielectric layer. In this cut plane, the dielectric particle and the grain boundary was identified by STEM observation. Next, in arbitrarily selected 10 points of the grain boundary, by using the EDS device equipped with the STEM, the point analysis was carried out. Characteristic X-rays obtained by the measurement were analyzed quantitatively, and the content ratios of Mg and Si were calculated from the weight of the detected elements in terms of the oxides. By calculating the average of the content ratios of Mg and Si obtained in each measurement point, the content ratios of Mg and Si in the grain boundary were calculated. The results were shown in Table 1.

(The Specific Permittivity ∈)

The specific permittivity ∈ (no unit) was calculated against the capacitor sample from the capacitance measured under the condition at the standard temperature 25° C., a frequency 1 kHz and an input signal level (measured voltage) 0.5Vrms by the digital LCR meter (made by YHP corporation 4274A). The higher the specific permittivity, the more preferable it is, and in the present example, 4300 or more is considered good, and 5000 or more is further preferable. The results are shown in Table 1.

(The Temperature Characteristic of the Capacitance)

The capacitance was measured against the capacitor sample under the condition at standard temperature of 25° C., a frequency 1 kHz and an input signal level (measured voltage) 0.5Vrms by the digital LCR meter (made by YHP corporation 4274A), then the capacitance at −55 to 85° C. was measured and the changing rate ΔC of the capacitance was calculated against the capacitance at 25° C.; and evaluated whether the changing rate ΔC was within ±15%. That is, it was evaluated whether it satisfies the X5R characteristic. The results are shown in Table 1. In the Table 1, if X5R characteristic is satisfied, it was considered good "○", and those which do not satisfy were considered bad "x".

TABLE 1

| Sample No. | Content ratio in the grain boundary | | Characteristics | |
|---|---|---|---|---|
| | Si [wt %] | Mg [wt %] | Specific permittivity ε | Temperature characteristic X5R |
| 1 | 0.2 | 1.2 | 6500 | x |
| 2 | 0.4 | 1.2 | 6000 | ○ |
| 3 | 1.0 | 1.2 | 5800 | ○ |
| 4 | 4.0 | 1.2 | 5300 | ○ |
| 5 | 6.0 | 1.2 | 5000 | ○ |
| 6 | 8.0 | 1.2 | 4400 | ○ |
| 7 | 10.0 | 1.2 | 4100 | ○ |
| 8 | 4.0 | 0.1 | 6200 | x |
| 9 | 4.0 | 0.2 | 5800 | ○ |

TABLE 1-continued

| Sample No. | Content ratio in the grain boundary | | Characteristics | |
|---|---|---|---|---|
| | Si [wt %] | Mg [wt %] | Specific permittivity ε | Temperature characteristic X5R |
| 10 | 4.0 | 0.4 | 5600 | ○ |
| 11 | 4.0 | 1.8 | 4300 | ○ |
| 12 | 4.0 | 2.0 | 3900 | ○ |

According to Table 1, when the content ratios of Mg and Si in the grain boundary are out of the above described range (the sample numbers 1, 7, 8 and 12), then it was confirmed that the specific permittivity or the temperature characteristic was deteriorated.

On the contrast to this, when the content ratios of Mg and Si in the grain boundary are within the above described range (the sample numbers 2 to 6, 9 to 11), then it was confirmed that the specific permittivity or the temperature characteristic was good.

(Experiment 2)

Other than setting the third holding temperature T3 at the third heat treatment to the range in between 650 to 1100° C., the capacitor sample was produced as same as the sample number 4, and the same evaluation as the experiment 1 was carried out, further the high temperature acceleration lifetime (HALT) was evaluated which is shown in the below. The results are shown in Table 2. Note that, in the present example, the same measurement as that of the content ratios of Mg and Si was carried out to the content ratio of Ni in the grain boundary.

(The High Temperature Acceleration Lifetime (HALT))

The high temperature acceleration lifetime was evaluated by measuring the insulation resistance (IR) over the time while applying the DC voltage under the electric field of 6.3 V/μm at 160° C. In the present example, the time the insulation resistance drops by one order from the start of applying voltage was set as the breakdown time, and mean time to failure was calculated by carrying out the Weibull analysis thereto. In the present example, the above evaluation was carried out to 20 capacitor samples and an average of the mean time to failure was determined as lifetime (MTTF). In the present example, 10 hours or longer was considered as good. The results are shown in Table 2.

TABLE 2

| Sample No. | Content ratio in the grain boundary | | | Characteristics | | |
|---|---|---|---|---|---|---|
| | Si [wt %] | Mg [wt %] | Ni [wt %] | Specific permittivity ε | Temperature characteristic X5R | High temperature acceleration lifetime MTTF [h] |
| 13 | 4.0 | 1.2 | 0 | 5300 | ○ | 6.5 |
| 4 | 4.0 | 1.2 | 0.1 | 5300 | ○ | 35 |
| 14 | 4.0 | 1.2 | 0.8 | 5200 | ○ | 28 |
| 15 | 4.0 | 1.2 | 1.5 | 5000 | ○ | 16 |
| 16 | 4.0 | 1.2 | 2.0 | 4500 | ○ | 9 |

According to Table 2, when the content ratio of Ni in the grain boundary is out of the above described range (the sample numbers 13 and 16), then it was confirmed that good MTTF cannot be obtained.

On the contrary to this, when the content ratio of Ni in the grain boundary is within the above described range (the sample numbers 4, 14 and 15), then it was confirmed that good MTTF can be obtained.

(Experiment 3)

Other than selecting at least one from the group consisting of $Y_2O_3$, $Dy_2O_3$, $Ho_2O_3$, and $Gd_2O_3$ as the oxide of R element, and controlling the content ratio thereof within the range of 0.2 to 2.5 mol, the capacitor samples 17 to 21 were produced as same as the sample number 2, and the evaluation was carried out as same as the experiment 2. Note that, in the sample number 17, the content of $Y_2O_3$ was 0.4 mol. In the sample number 18, the content of $Dy_2O_3$ was 2.0 mol. In the sample number 19, the content of $Y_2O_3$ was 1.5 mol, and the content of $Dy_2O_3$ was 1.0 mol. In the sample number 20, the content of $Y_2O_3$ was 1.5 mol, and the content of $Ho_2O_3$ was 0.5 mol. In the sample number 21, the content of $Y_2O_3$ was 1.5 mol, and the content of $Gd_2O_3$ was 0.2 mol. The results are shown in Table 3. Note that, in the present example, the same measurement as that of content ratios of Mg and Si was carried out to the content ratio of the R element in the grain boundary.

the index indicating the deviation of the grain boundary thickness, was calculated by using the following equation, C.V. value=(the standard deviation/the average)×100

The results are shown in Table 4,

TABLE 3

| | Content ratio in the grain boundary | | | | Characteristics | | |
|---|---|---|---|---|---|---|---|
| Sample No. | R [wt %] | Si [wt %] | Mg [wt %] | Ni [wt %] | Specific permittivity $\epsilon$ | Temperature characteristic X5R | High temperature acceleration lifetime MTTF [h] |
| 2 | Y: 3.0 | 0.4 | 1.2 | 0.1 | 6000 | ○ | 12 |
| 15 | Y: 3.0 | 4.0 | 1.2 | 1.5 | 5000 | ○ | 16 |
| 17 | Y: 3.0 | 4.0 | 1.2 | 0.1 | 5300 | ○ | 25 |
| 4 | Y: 4.5 | 4.0 | 1.2 | 0.1 | 5300 | ○ | 35 |
| 18 | Dy: 4.5 | 4.0 | 1.2 | 0.1 | 5700 | ○ | 30 |
| 19 | Y: 4.5, Dy: 1.0 | 4.0 | 1.2 | 0.1 | 5500 | ○ | 45 |
| 20 | Y: 4.3, Ho: 1.2 | 4.0 | 1.2 | 0.1 | 5600 | ○ | 42 |
| 21 | Y: 3.8, Gd: 0.8 | 4.0 | 1.2 | 0.1 | 5600 | ○ | 40 |

According to Table 3, when the content ratios of Mg, Si, Ni and R element in the grain boundary satisfy the above described relation (the sample numbers 2, 4, 15, 17 to 21), then it was confirmed that high specific permittivity and good temperature characteristic were exhibited, and also a good MTTF was obtained.

(Experiment 4)

Other than setting the second oxygen partial pressure (2nd $PO_2$) at the second heat treatment step S2 within the range of $1.0\times10^{-10}$ to $1.0\times10^{-7}$ Pa, and setting the holding time to 2.4 to 240 hours, the capacitor sample was produced as same as the sample number 4; and the thickness of the grain boundary was measured as described in the below, further the above described evaluation of the high temperature acceleration lifetime was carried out. The results are shown in Table 4. Note that, in the present example, the Weibull constant ("m value") was also calculated in the evaluation of the high temperature acceleration lifetime. The "m value" is preferably 2.0 or more.

(The Average of the Thickness of the Grain Boundary and C.V. Value Thereof)

First, the capacitor sample was cut at a vertical plane to the dielectric layer. In this cut plane, the dielectric particle and the grain boundary were identified by STEM observation. Next, the thickness of the area having a different contrast than the dielectric particle was calculated by image analysis. This measurement was carried out to 40 grain boundaries, and the average was calculated from the measured values of thickness of the grain boundary at each measurement point, said average was set as the average thickness of the grain boundary. Further, the standard deviation was obtained from the measured values of thickness of the grain boundary, and from this standard deviation and the average, and a C.V. value, which is

TABLE 4

| | Thickness of the grain boundary | | Characteristics High temperature acceleration lifetime | |
|---|---|---|---|---|
| Sample No. | Average [nm] | C.V. value | MTTF [h] | m value |
| 22 | 0.3 | 15 | 30 | 3.3 |
| 4 | 0.7 | 15 | 35 | 4.0 |
| 23 | 0.9 | 15 | 33 | 2.6 |
| 24 | 1.0 | 15 | 35 | 1.8 |
| 25 | 0.7 | 25 | 31 | 2.0 |
| 26 | 0.7 | 20 | 34 | 2.5 |
| 27 | 0.7 | 8 | 40 | 7.2 |

According to Table 4, when the average of the grain boundary thickness is out of the above described range (the sample number 24), it was confirmed that "m value" tends to deteriorate.

On the contrary to this, when the average of the grain boundary thickness and the C.V. value of the grain boundary thickness were within the above described range (the sample numbers 4, 22, 23, 25 to 27), then it was confirmed that a good "m value" can be obtained.

(Experiment 5)

Other than setting the content of the oxide of Mg (MgO) within the range of 0.4 to 2.5 mol in terms of MgO, and setting the content of the oxide including $SiO_2$ (BCG) within the range of 0.2 to 3.0 mol in terms of $SiO_2$; the capacitor sample was made as same as the sample number 4. Note that, in the sample number 28, the content in terms of MgO was 0.4 mol and the content in terms of $SiO_2$ was 0.2 mol. In sampler number 29, the content in terms of MgO was 1.0 mol and the content in terms of $SiO_2$ was 0.4 mol. In the sample number 30, the content in terms of MgO was 2.5 mol and the content in terms of $SiO_2$ was 0.5 mol. In sample number 31, the content in terms of MgO was 2.5 mol and the content in terms of $SiO_2$ was 1.2 mol. In the sample number 32, the content in terms of MgO was 1.25 mol and the content in terms of $SiO_2$ was 3.0 mol.

To the obtained capacitor sample, the area ratio of the segregation area was measured by the method described in the following, and the same evaluation as the experiment 1 was carried out, further, the dielectric loss (tan δ) shown in below was evaluated. The results are shown in Table 5.

(The Area Ratio of the Segregation Area)

First, the capacitor sample was cut at a vertical plane to the dielectric layer. In this cut plane, the observation using the STEM at the magnification of 7000× was carried out to 5 visual fields. Next, in the visual field area of the 5 visual fields, the area having a different contrast from both the dielectric layer and the internal electrode layer was determined as the segregation area, and the area ratio where the segregation area occupies against the cross section of the capacitor sample was calculated. The results are shown in Table 5.

(The Dielectric Loss (Tan δ))

The dielectric loss (tan δ) was measured against the capacitor sample at standard temperature 25° C., under the condition of frequency 1 kHz and the input signal (the measured voltage) 0.5Vrms using the digital LCR meter (made by YHP Coorporation, 4274A). The lower the dielectric loss is, the more preferable it is, and in the present example, 10% or less was considered good. The results are shown in Table 5.

TABLE 5

| Sample No. | Segregation area Area ratio [%] | Characteristics Specific permittivity ε | Temperature characteristic X5R | tanδ [%] |
|---|---|---|---|---|
| 28 | 0 | 4900 | ◯ | 6.5 |
| 29 | 0.10 | 5200 | ◯ | 6.8 |
| 30 | 0.15 | 5300 | ◯ | 6.9 |
| 4 | 1.0 | 5300 | ◯ | 7.0 |
| 31 | 3.0 | 5800 | ◯ | 7.5 |
| 32 | 5.0 | 6300 | ◯ | 9.8 |

According to Table 5, by setting the area ratio of the segregation area within the above mentioned range (the sample numbers 4, 28 to 32), even though the dielectric loss slightly deteriorates, the specific permittivity was confirmed to be improved.

(Experiment 6)

In the sample number 33, the temperature decreasing rate was 2° C./hour in the range of 1200 to 1000° C. in the first heat treatment step S1, in the sample number 34, the temperature decreasing step in the first heat treatment and the holding step in the second heat treatment was continuous, and in the sample number 35, the temperature was dropped to 900° C. or less in the temperature decreasing step in the first heat treatment and then temperature was raised to the holding temperature of the second heat treatment. Other than that, the capacitor sample was made as same as the sample number 4, then the ratio in which the segregation area contacts with the internal electrode layer was measured by the method described in below. Further, the presence of the crack was evaluated by exterior examination to the sample after the high temperature acceleration lifetime test. The results are shown in Table 6.

(The Ratio where the Segregation Area Contacts with the Internal Electrode Layer)

As same as the calculation of the area ratio of the segregation area, to the cut plane of the capacitor sample, the observation using the STEM at the magnification of 7000× was carried out to 5 visual fields. Next, in the area of the 5 visual fields, the number of the segregation area observed in the 5 visual fields and the number of the segregation area which contacts with the internal electrode layer were counted by visual observation; then the ratio in which the segregation area contacts with the internal electrode layer was calculated. The results are shown in Table 6.

(The Crack)

First, the above mentioned high temperature acceleration lifetime test was carried out to the capacitor sample in which the ratio of the segregation area which contacts with the internal electrode layer has been calculated. To the sample after the test, whether a crack was observed or not was examined by the exterior examination. The exterior examination was carried out to 20 samples. In the present example, it is preferable that no crack is observed. The results are shown in Table 6.

TABLE 6

| Sample No. | Segregation area Ratio in contact with the internal electrode [%] | Characteristics crack |
|---|---|---|
| 33 | 10 | 1/20 |
| 34 | 20 | 0/20 |
| 35 | 50 | 0/20 |
| 4 | 95 | 0/20 |

According to Table 6, when the ratio of the segregation area which contacts with the internal electrode layer is within the above range (the sample numbers 4, 34, 35), it was confirmed that no crack was observed.

(Experiment 7)

The green chip was made as same as the experiment 1, and the same binder removal treatment as the experiment 1 was carried out. Note that, the materials and the composition of the dielectric ceramic composition were the same as the experiment 1. In regards with the green chip after the binder removal treatment, the first heat treatment step S1 to the third heat treatment step S3 were carried out in the following condition, thereby the element body as the sintered body was obtained.

In the first heat treatment step S1, the temperature rising rate: 200 to 2000° C./hour, first holding temperature T1: as described in Table 7, the first holing time t1: 0.5 to 2 hours, the temperature decreasing rate: 200 to 2000° C./hour, the atmospheric gas: wet $N_2+H_2$ mixed gas, the first oxygen partial pressure (1st $PO_2$): as described in Table 7. Note that, in the Table, "m×E−n" refers to "m×10$^{-n}$". The same holds true for rest of all.

In the second heat treatment step S2, the temperature rising rate: 200° C./hour, the holding temperature: 1000 to 1200° C., the second holding time t2: 100 hours, the temperature decreasing rate: 200° C./hour, the atmospheric gas: wet $N_2+H_2$ gas, and the second oxygen partial pressure (2nd $PO_2$): as described in Table 7. The first heat treatment step S1 and the second heat treatment step S2 were separated as shown in FIG. 5.

As shown in FIG. 5, the third heat treatment step S3 was separated as the same as the first heat treatment step S1 and the second heat treatment step S2. The third holding temperature T3: as described in table 7, the third holding time: t3: 2 hours, the temperature decreasing rate: 200° C./hour, the atmospheric gas: wet $N_2$ gas, and the third oxygen partial pressure (3rd $PO_2$): as described in Table 7.

Note that, for wetting the atmospheric gas from the first heat treatment step S1 to the third heat treatment step S3, the wetter as same as the experiment 1 was used.

For obtained element body, as same as the experiment 1, the external electrode was formed, and the multilayer ceramic capacitor was obtained.

For the obtained capacitor samples 51 to 73, the same evaluations as the experiment 2 were carried out, and the IR malfunction as shown in the following was carried out.

(The IR Malfunction)

With respect to the capacitor samples, the insulation resistance IR was measured by applying the DC 10V at 20° C. for 30 seconds to 30 capacitor samples by using the insulator resistance meter (made by Advantest Corporation R8340A). When 5 or more samples having an insulator resistance of less than $1.0 \times 10^{-8}$ were found, it was determined as a malfunction "x", and when 1 to 4 samples having an insulator resistance dropped by one or more order were found, it was determined good "○", and if none was found it was determined very good "⊚". The results are shown in Table 7, than 1200° C., the high temperature acceleration lifetime was low. It is thought to be caused by the progression of the particle growth of the dielectric particle, and the generation of a part having extremely thin grain boundary or so.

Also, in the sample number 60 having the second holding temperature T2 of 1000° C. or less, the specific permittivity ∈ was low and also the high temperature acceleration lifetime was low. It is thought to be caused by the insufficient diffusion control of the subcomponents when the temperature is too low. Also, in the sample number 61 which has the 2nd $PO_2$ slightly higher than $1 \times 10^{-7}$ [Pa], the high temperature acceleration lifetime was low. It is thought to be caused by the same reason as the sample number 52. Also, in the sample number 64 having slightly lower 2nd $PO_2$ than $1 \times 10^{-10}$ [Pa], many IR malfunction took place, which is not good. It is thought to be caused by the excessive generation of the oxygen deficiency in the dielectric particle when the 2nd $PO_2$ is too low.

TABLE 7

| | First heat treatment (S1) | | Second heat treatment (S2) | | Third heat treatment (S3) | | Characteristics | | | |
|---|---|---|---|---|---|---|---|---|---|---|
| Sample No. | 1st $PO_2$ [Pa] | Temperature T1 [° C.] | 2nd $PO_2$ [Pa] | Temperature T2 [° C.] | 3rd $PO_2$ [Pa] | Temperature T3 [° C.] | Specific permittivity ∈ | Temperature characteristic X5R | High temperature acceleration lifetime MTTF [h] | IR malfunction |
| 51 | 1 × E−6 | 1250 | — | — | 4 × E−1 | 1100 | 4100 | ○ | 10 | ⊚ |
| 52 | 1 × E−6 | 1250 | 4 × E−1 | 1100 | 1 × E−1 | 1000 | 4000 | ○ | 12 | ⊚ |
| 53 | 1 × E−6 | 1250 | 1 × E−8 | 1100 | — | — | 5000 | ○ | 1 | X |
| 54 | 1 × E−6 | 1250 | 1 × E−7 | 1260 | 1 × E−1 | 1160 | 6000 | X | 2 | X |
| 55 | 1 × E−6 | 1250 | 1 × E−7 | 1200 | 1 × E−1 | 1100 | 5500 | ○ | 15 | ○ |
| 56 | 1 × E−6 | 1250 | 1 × E−8 | 1150 | 1 × E−1 | 1000 | 5200 | ○ | 30 | ⊚ |
| 57 | 1 × E−6 | 1250 | 1 × E−8 | 1100 | 1 × E−1 | 1000 | 5000 | ○ | 33 | ⊚ |
| 58 | 1 × E−6 | 1250 | 1 × E−9 | 1030 | 1 × E−1 | 1000 | 5000 | ○ | 24 | ⊚ |
| 59 | 1 × E−6 | 1250 | 1 × E−10 | 1010 | 1 × E−3 | 910 | 4500 | ○ | 20 | ○ |
| 60 | 1 × E−6 | 1250 | 1 × E−10 | 960 | 1 × E−3 | 860 | 3800 | ○ | 8 | ○ |
| 61 | 1 × E−6 | 1250 | 5 × E−7 | 1100 | 1 × E−1 | 1000 | 4600 | ○ | 9 | ○ |
| 61a | 1 × E−6 | 1250 | 1.5 × E−8 | 1100 | 1 × E−1 | 1000 | 5000 | ○ | 26 | ⊚ |
| 62 | 1 × E−6 | 1250 | 1 × E−9 | 1100 | 1 × E−1 | 1000 | 5100 | ○ | 34 | ⊚ |
| 63 | 1 × E−6 | 1250 | 1 × E−10 | 1100 | 1 × E−1 | 1000 | 5400 | ○ | 36 | ⊚ |
| 64 | 1 × E−6 | 1250 | 5 × E−11 | 1100 | 1 × E−1 | 1000 | 5600 | ○ | 19 | X |
| 65 | 1 × E−3 | 1260 | 1 × E−7 | 1100 | 1 × E−1 | 1000 | 5100 | ○ | 30 | ⊚ |
| 66 | 1 × E−3 | 1260 | 1 × E−10 | 1100 | 1 × E−1 | 1000 | 5500 | ○ | 33 | ⊚ |
| 67 | 1 × E−8 | 1230 | 1 × E−7 | 1100 | 1 × E−1 | 1000 | 4300 | ○ | 8 | ○ |
| 68 | 1 × E−8 | 1230 | 1 × E−10 | 1100 | 1 × E−1 | 1000 | 5100 | ○ | 30 | ⊚ |
| 69 | 1 × E−6 | 1250 | 1 × E−10 | 1100 | 7 × E−1 | 1100 | 5000 | ○ | 20 | ⊚ |
| 70 | 1 × E−6 | 1250 | 1 × E−10 | 1100 | 4 × E−1 | 1060 | 5200 | ○ | 30 | ⊚ |
| 71 | 1 × E−6 | 1250 | 1 × E−10 | 1100 | 1 × E−3 | 810 | 5400 | ○ | 31 | ⊚ |
| 72 | 1 × E−6 | 1250 | 1 × E−10 | 1100 | 7 × E−4 | 760 | 5400 | ○ | 25 | ⊚ |
| 73 | 1 × E−6 | 1250 | 1 × E−10 | 1100 | 1 × E−3 | 710 | 5400 | ○ | 22 | ⊚ |

As shown in Table 7, in the sample number 51 which does not have the second heat treatment step S2, the specific permittivity ∈ was low and also the high temperature acceleration lifetime was low. In the sample number 51 which does not have the second heat treatment step S2, it is thought that the diffusion control of the subcomponents was insufficient. Also, in the sample number 52 in which the second oxygen partial pressure (2nd PO2) is too high, the specific permittivity ∈ was low. The cause is thought to be the insufficient diffusion control of the subcomponents.

Further, in the sample number 53 which does not have the third heat treatment step S3, the high temperature acceleration lifetime was low. It is thought to be caused by the insufficient reoxidation treatment. Further, in the sample number 54 which has the second holding the temperature T2 higher Further, the sample number 61a in which the 1st $PO_2$, the dew point of the wetter and the concentration of the atmospheric gas were kept in order to control the oxygen partial pressure, but the 2nd $PO_2$ was set to the value as shown in Table 7 by only changing from T1 to T2; shows good characteristics. However, as shown in the sample numbers 57, 62, and 63, it is preferable to change the oxygen partial pressure itself when changing from 1st $PO_2$ to 2nd $PO_2$, from the point of view of the characteristics.

Further, even if the 2nd $PO_2$ is within the range of $1 \times 10^{-10}$ [Pa]≤2nd $PO_2$≤$1 \times 10^{-7}$ Pa, the sample number 67 having a higher oxygen partial pressure than 1st $PO_2$ has low specific permittivity and low high temperature acceleration lifetime. It is thought to be caused by the insufficient diffusion control of the subcomponents.

According to the sample numbers 55 to 59, 62, 63, 65, 66, 68 to 73 of the present examples produced by having all of the first heat treatment step Si to third heat treatment step S3, and by setting 2nd PO$_2$ to an oxygen partial pressure lower than the 1st PO$_2$ and within the range of ×10$^{-10}$ [Pa]≤2nd PO$_2$≤1×10$^{-7}$ [Pa], and setting the second holding temperature (T2) to the temperature lower than the first holding temperature (T1) and within the range of 1000 [° C.]<T2≤1200[° C.], and by setting the 3rd PO$_2$ to the temperature higher than the 1st PO$_2$; it was confirmed that X5R characteristics are satisfied, E was 4500 or more, the high temperature acceleration lifetime was 15 hours or longer, and IR malfunction was hardly observed.

(Experiment 8)

The capacitor samples 74, 75 and 76 were produced as same as the sample number 63 other than setting the second holding time t2 to 0.5 hour, 5 hours and 25 hours in the second heat treatment step S2, then the same evaluation as the experiment 7 was carried out in regards with the specific permittivity and the high temperature acceleration lifetime. The results are shown in Table 8.

TABLE 8

| Sample No. | Characteristics | | |
|---|---|---|---|
| | Second holding time t2 [h] | Specific permittivity ε | High temperature acceleration lifetime MTTF [h] |
| 74 | 0.5 | 4600 | 15 |
| 75 | 5 | 5000 | 21 |
| 63 | 100 | 5400 | 36 |
| 76 | 250 | 5500 | 34 |

As shown in Table 8, by setting the second holding time t2 to twice or more longer time than the first holding time t1, the specific permittivity and the high temperature acceleration lifetime can be further improved.

(Experiment 9)

In the composition of the dielectric ceramic composition constituting the dielectric layer, except for controlling the composition of the material so that Si/Mg showing mole ratio becomes 0.48 and 0.7, the capacitor samples 77 and 78 were made as same as the sample number 63; and the same evaluation as the experiment 7 was carried out in connection with the specific permittivity and the high temperature acceleration lifetime were evaluated. The results are shown in Table 9.

TABLE 9

| Sample No. | Si/Mg | Characteristics | |
|---|---|---|---|
| | | Specific permittivity ε | High temperature acceleration lifetime MTTF [h] |
| 63 | 0.25 | 5400 | 36 |
| 77 | 0.48 | 5000 | 35 |
| 78 | 0.7 | 4700 | 40 |

As shown in Table 9, by setting the mole ratio (Si/Mg) to 0.5 or less, it was confirmed that the specific permittivity can be improved.

(Experiment 10)

In the composition of the dielectric ceramic composition constituting the dielectric layer, except for controlling composition by changing the number of moles of Y$_2$O$_3$ or Dy$_2$O$_3$ as the rare earth element R, the number of moles of MnO or Cr$_2$O$_3$, or the number of moles of V$_2$O$_5$ as shown in Table 10, the capacitor samples 79 to 85 were made as same as the sample number 63; and the same evaluation as the experiment 7 was carried out in connection with the specific permittivity and the high temperature acceleration lifetime. The results are shown in Table 10. Note that, in regards with the sample numbers 83a, 83b, and 83c, the rare earth element shown in Table 10 was used in the number of moles shown in Table 10 instead of Dy$_2$O$_3$. The number moles of Tb used in the sample number 83b was the number of moles in terms of Tb$_2$O$_{3.5}$.

TABLE 10

| Sample No. | R | | Mn or Cr | | | Specific permittivity ε | High temperature acceleration lifetime MTTF [h] |
|---|---|---|---|---|---|---|---|
| | Y$_2$O$_3$ | Dy$_2$O$_3$ | MnO | Cr$_2$O$_3$ | V$_2$O$_5$ | | |
| 63 | 1.0 | 0 | 0.1 | 0 | 0.1 | 5400 | 36 |
| 79 | 0 | 1.0 | 0.1 | 0 | 0.1 | 5700 | 30 |
| 80 | 0.5 | 0 | 0.1 | 0 | 0.1 | 5400 | 25 |
| 81 | 2.0 | 0 | 0.1 | 0 | 0.1 | 5000 | 40 |
| 82 | 1.0 | 0.2 | 0.1 | 0 | 0.1 | 5500 | 45 |
| 83a | 0.8 | Gd$_2$O$_3$: 0.3 | 0.1 | 0.1 | 0.1 | 5300 | 47 |
| 83b | 0.8 | Tb$_2$O$_{3.5}$: 0.3 | 0.1 | 0.1 | 0.1 | 5000 | 50 |
| 83 | 0.8 | 0.5 | 0.1 | 0.1 | 0.1 | 5600 | 40 |
| 83c | 0.8 | Ho$_2$O$_3$: 0.4 | 0.1 | 0.1 | 0.1 | 5800 | 38 |
| 84 | 1.0 | 0 | 0 | 0.3 | 0.1 | 5000 | 37 |
| 85 | 1.0 | 0 | 0 | 0.3 | 0.02 | 5400 | 20 |

As shown in Table 10, even when the types of rare earth element R are changed, the number of moles of MnO or Cr$_2$O$_3$ is changed, or the number of moles of V$_2$O$_5$ is changed, it was confirmed that the same result as the sample number 63 can be obtained. Particularly, by including both Y$_2$O$_3$ and Dy$_2$O$_3$ as the rare earth element, it was confirmed that both of the specific permittivity and the high temperature acceleration lifetime are improved. Further, when including Gd$_2$O$_3$, Tb$_2$O$_{3.5}$, or Ho$_2$O$_3$ instead of Dy$_2$O$_3$ with Y$_2$O$_3$, the same result as Dy$_2$O$_3$ can be obtained. From this experiment result, it can be speculated that even when the composition of the dielectric ceramic composition is changed, the same result can be obtained according to the above mentioned method of production.

(Experiment 11)

As for the different heat treatment step from those shown in FIG. 4, the first heat treatment step S1 and the second heat treatment step S2 were carried out continuously, or the fourth holding temperature T4 area, i.e. T4=900° C., were provided in between the first heat treatment step S1 and the second heat treatment step S2. Other than that, the capacitor samples 86 and 87 were made same as the sample number 63, and the same evaluation as the experiment 7 was carried out in connection with the specific permittivity and the high temperature acceleration lifetime. The results are shown in Table 11.

μm, and the number of the dielectric layers sandwiched by the internal electrode layers were 300. Other than that, the capacitor samples 88 to 102 were made as same as the experiment 7, and the same evaluations as the experiment 7 was carried out. The results are shown in Table 12.

TABLE 12

| Sample No. | First heat treatment (S1) | | Second heat treatment (S2) | | Third heat treatment (S3) | | Characteristics | | | |
|---|---|---|---|---|---|---|---|---|---|---|
| | 1st $PO_2$ [Pa] | Temperature T1 [° C.] | 2nd $PO_2$ [Pa] | Temperature T2 [° C.] | 3rd $PO_2$ [Pa] | Temperature T3 [° C.] | Specific permittivity ε | Temperature characteristic X5R | High temperature acceleration lifetime MTTF [h] | IR malfunction |
| 88 | 1 × E−7 | 1150 | — | — | 1 × E−1 | 1000 | 3800 | ○ | 6 | ○ |
| 89 | 1 × E−7 | 1150 | 1 × E−8 | 1150 | 1 × E−1 | 1000 | 5100 | X | 1 | X |
| 90 | 1 × E−7 | 1150 | 1 × E−8 | 1100 | 1 × E−1 | 1000 | 4500 | ○ | 24 | ⊚ |
| 91 | 1 × E−7 | 1150 | 1 × E−9 | 1030 | 1 × E−3 | 910 | 4500 | ○ | 16 | ⊚ |
| 92 | 1 × E−7 | 1150 | 1 × E−10 | 1010 | 1 × E−3 | 910 | 4400 | ○ | 12 | ○ |
| 93 | 1 × E−7 | 1150 | 1 × E−10 | 960 | 1 × E−3 | 860 | 3800 | ○ | 3 | ○ |
| 94 | 1 × E−7 | 1150 | 1 × E−7 | 1100 | 1 × E−1 | 1000 | 4000 | ○ | 8 | ○ |
| 94a | 1 × E−7 | 1150 | 2 × E−8 | 1100 | 1 × E−1 | 1000 | 4300 | ○ | 17 | ⊚ |
| 95 | 1 × E−7 | 1150 | 1 × E−10 | 1100 | 1 × E−1 | 1000 | 4800 | ○ | 20 | ⊚ |
| 96 | 1 × E−7 | 1150 | 5 × E−11 | 1100 | 1 × E−1 | 1000 | 4900 | ○ | 2 | X |
| 97 | 1 × E−5 | 1170 | 1 × E−7 | 1100 | 1 × E−1 | 1000 | 4700 | ○ | 25 | ⊚ |
| 98 | 1 × E−5 | 1170 | 1 × E−10 | 1100 | 1 × E−1 | 1000 | 4500 | ○ | 26 | ⊚ |
| 99 | 1 × E−7 | 1150 | 1 × E−10 | 1100 | 7 × E−1 | 1100 | 4500 | ○ | 15 | ⊚ |
| 100 | 1 × E−7 | 1150 | 1 × E−10 | 1100 | 4 × E−1 | 1060 | 4600 | ○ | 20 | ⊚ |
| 101 | 1 × E−7 | 1150 | 1 × E−10 | 1100 | 1 × E−3 | 810 | 4800 | ○ | 22 | ⊚ |
| 102 | 1 × E−7 | 1150 | 1 × E−10 | 1100 | 1 × E−3 | 760 | 4800 | ○ | 16 | ⊚ |

TABLE 11

| Smaple No. | Conditions | Specific permittivity ε | High temperature acceleration lifetime MTTF [h] |
|---|---|---|---|
| 86 | First to second carried out continuously | 5000 | 28 |
| 87 | Comprising temperature decreasing step to 900° C. in between first and second | 5300 | 35 |
| 63 | Separating first and second | 5400 | 36 |

As shown in Table 11, when the temperature decreasing step of 900° C. or less is provided in between the first heat treatment step S1 and the second heat treatment step S2, it was confirmed that particularly the specific permittivity and the high temperature acceleration lifetime were improved. From this experiment, it is speculated that according to the above mentioned method of production, the same effect can be expected even when the heat treatment pattern is changed.

(Experiment 12)

The $BaTiO_3$ powder as the main component having the average particle diameter of 0.20 μm was used, and 1.5 mol of MgO, 1.0 mol of $Y_2O_3$, 0.7 mol of BCG, 0.1 mol of MnO, 0.1 mol of $V_2O_5$, each of them in terms of oxides with respect to 100 mol of $BaTiO_3$, and the composition was controlled so that the Si/Mg became 0.47; then the condition was set as indicated in Table 12, the thickness of the dielectric layer was 0.8 μm, the thickness of the internal electrode layer was 0.7

As shown in Table 12, in the sample number 88 which does not have the second heat treatment step S2, it was confirmed that specific permittivity E is low and also the high temperature acceleration lifetime was low. It is thought to be caused by the insufficient diffusion control of the subcomponents. Also, in the sample number 89 in which the second holding temperature T2 and the first holding temperature T1 were the same, it was confirmed that the high temperature acceleration lifetime was low. It is thought to be caused by progression of the particle growth of the dielectric particle and the generation of a part having extremely thin grain boundary.

Also, in the sample number 93 in which the second holding temperature T2 is 1000° C. or less, it was confirmed that specific permittivity E was low and also the high temperature acceleration lifetime was low. It is thought to be caused by the insufficient diffusion control of the subcomponents.

Also, in the sample number 94 in which the 2nd $PO_2$ is set as same as the 1st $PO_2$, it was confirmed that specific permittivity is low and also the high temperature acceleration lifetime was low. It is thought to be caused by the insufficient diffusion control of the subcomponents. In the sample number 96 in which the 2nd $PO_2$ is lower than $1 \times 10^{-10}$ [Pa], it was confirmed that the high temperature acceleration lifetime was low. It is thought to be caused by excessive generation of oxygen deficiency in the dielectric particle.

Also, the sample number 94a wherein the 1st $PO_2$, the dew point of the wetter and the atmospheric gas concentration was kept in order to control the oxygen partial pressure, but the 2nd $PO_2$ is set to the value shown in Table 12 by only changing from T1 to T2, shows good characteristics; however it is preferable to control the oxygen partial pressure itself from the point of view of the characteristics as shown in sample numbers 90 and 95.

When the average particle diameter of $BaTiO_3$ powder as the main component is smaller than that of experiment 7 and the dielectric layer is thinner than that of experiment 7, according to the sample numbers 90 to 92, 95, 97 to 102 of the present examples produced by having all of the first heat treatment step S1 to third heat treatment step S3, and by setting 2nd $PO_2$ to an oxygen partial pressure lower than the 1st $PO_2$ and within the range of $\times 10^{-10}$ [Pa]$\leq$2nd $PO_2 \leq 1 \times 10^{-7}$ [Pa], and setting the second holding temperature (T2) to the temperature lower than the first holding temperature (T1) and within the range of 1000 [° C.]<T2$\leq$1200 [° C.], and by setting the 3rd $PO_2$ to the temperature higher than the 1st $PO_2$; it was confirmed that X5R characteristics are satisfied, $\in$ was 4400 or more, the high temperature acceleration lifetime was 12 hours or longer, and IR malfunction was hardly observed. That is, when the average particle diameter of $BaTiO_3$ powder as the main component is smaller than that of experiment 7 and the dielectric layer is thinner than that of experiment 7, the specific permittivity decreases, however by using the above method, it was confirmed that the similar effect can be obtained as a whole. Of course, it is speculated that the above method is effective also when the average particle diameter of $BaTiO_3$ powder as the main component is large, or when the thickness of the dielectric layer is thick.

(Experiment 13)

Other than changing the order of the heat treatment steps as shown in Table 13, the capacitor samples 103 to 106 were made as same as the experiment 7, and the same evaluations as the experiment 7 were carried out in regards with the specific permittivity and the high temperature acceleration lifetime. The results are shown in Table 13.

TABLE 13

| Sample No. | Conditions | Specific permittivity $\epsilon$ | High temperature acceleration lifetime MTTF [h] |
|---|---|---|---|
| 51 | First heat treatment → Third heat treatment | 4100 | 10 |
| 53 | First heat treatment → Second heat treatment | 5000 | 1 |
| 56 | First heat treatment → Second heat treatment →Third heat treatment | 5000 | 33 |
| 103 | First heat treatment →Third heat treatment →Second heat treatment | 5000 | 3 |
| 104 | First heat treatment →Third heat treatment →Second heat treatment →Third heat treatment | 5000 | 37 |
| 105 | First heat treatment →Third heat treatment →First heat treatment →Second heat treatment →Third heat treatment | 6000 | 3 |
| 106 | First heat treatment → Second heat treatment →Third heat treatment →Second heat treatment →Third heat treatment | 5500 | 40 |

As shown in Table 13, if the third heat treatment is not carried out at the last step of the heat treatment steps, it was confirmed that the high temperature acceleration lifetime was low. It is thought to be caused by the failure of the reoxidation of the dielectric layer. Also, it was confirmed that the high temperature acceleration lifetime can be further improved by carrying out plurality of third heat treatments. Further, if the first heat treatment is carried out other than the first time of the heat treatment steps, then the dielectric particle growth occurs and the high temperature acceleration lifetime was lowered. By carrying out plurality of second heat treatment and the third heat treatment, it was confirmed that both the specific permittivity and the high temperature acceleration lifetime were improved. By carrying out the third heat treatment on the way of the heat treatment steps, it was confirmed that the increase of the oxygen deficiency of the barium titanate due to the long time reduction can be relieved.

(Experiment 14)

In the present experiment, it was focused on the second heat treatment step S2, and the following two experiments were carried out to the samples evaluated in experiments 7 to 12.

(The Densification Change)

The sample after the first heat treatment step S1 was cut at a vertical plane to the dielectric layer. In this cut plane, 10 visual fields were observed by STEM at magnification of 5000×. Next, the area ratio which the void occupies with respect to the cross section area of the sample was calculated by extracting the void in the dielectric layer in the area of the 10 visual fields. As a result, the air space ratio was less than 0.05% in all the experiments except for the experiment 11.

That is, at the end of the first heat treatment step S1, the sintering is carried out sufficiently, thus it is thought that during the second heat treatment step S2, the density of the dielectric layer hardly changes.

(The Change of the Crystal Particle Diameter of the Dielectric Particle)

To the sample after the first heat treatment S1 and the sample after the second heat treatment S2 were cut at a vertical plane to the dielectric layer. At the center of the sample and the outer most layer of the dielectric layer in this cut plane, the average area of the dielectric particle was measured and the diameter was calculated as the equivalent circle diameter. Then, the crystal particle diameter of the dielectric particle was determined by multiplying the diameter by 1.27. This crystal particle diameter was measured to 200 or more of the dielectric particles, and the average crystal particle diameter (unit: μm) was determined from the value having the cumulative frequency of 50% based on the cumulative frequency distribution of the obtained crystal particle diameters.

As a result of comparing the average crystal particle diameter at the center of the sample and that of the outer most layer of the dielectric layer, there was no change in the dielectric particle diameter in all of the experiments except for the experiment 11. Note that, in regards with the sample numbers 54 and 89, the particle growth were confirmed at the outer most layer after the second heat treatment step S2.

As described in hereinabove, it is confirmed that the specific permittivity or so are not improved by improving the density of the dielectric layer. Also when the second holding temperature T2 in the second heat treatment step S2 is high, the particle growth of the dielectric particle occurs and it was confirmed that this is one of the cause the reliability deterioration.

| References of the numerals | |
|---|---|
| 1 | multilayer ceramic capacitor |
| 10 | element body |
| 2 | dielectric layer |
| 20 | dielectric particle |
| 22 | grain boundary |
| 28 | segregation area |
| 3 | internal electrode layer |
| 30 | electrode missing portion |
| 4 | external electrode |

The invention claimed is:

1. A multilayer ceramic electronic component comprising an element body in which a dielectric layer and an internal electrode layer are stacked, wherein said dielectric layer is constituted from a dielectric ceramic composition including;
   a compound having a perovskite type crystal structure expressed by a general formula of $ABO_3$, where A is at least one selected from a group consisting of Ba, Ca, and Sr; B is at least one selected from a group consisting of Ti, Zr, and Hf;

an oxide of Mg; an oxide of R element, where R element is one selected from a group consisting of Sc, Y, La, Ce, Pr, Nd, Pm, Sm, Eu, Gd, Tb, Dy, Ho, Er, Tm, Yb, and Lu; and an oxide including Si, said dielectric ceramic composition comprises a plurality of dielectric particles and a grain boundary present in between said dielectric particles adjacent to each other, in said grain boundary, wherein a content ratio of said Mg is set to D(Mg) and a content ratio of said Si is set to D(Si), said D(Mg) is 0.2 to 1.8 wt % in terms of MgO, and said D(Si) is 0.4 to 8.0 wt % in terms of $SiO_2$.

2. The multilayer ceramic electronic component as set forth in claim 1, wherein said internal electrode layer includes Ni, and wherein a content ratio of said Ni in the grain boundary is set to D(Ni), said D(Ni) is more than 0 wt % and 1.5 wt % or less in terms of NiO.

3. The multilayer ceramic electronic component as set forth in claim 1, wherein said D(Mg) and said D(Si) satisfy a relation of D(Si)>D(Mg).

4. The multilayer ceramic electronic component as set forth in claim 3, wherein said D(Mg), said D(Si) and said D(Ni) satisfy a relation of D(Si)>D(Mg)>D(Ni).

5. The multilayer ceramic electronic component as set forth in claim 3, wherein a content ratio of said R element in the grain boundary is set to D(R), D(Mg), said D(Si), said D(Ni) and said D(R) satisfy a relation of D(R)>D(Si)>D(Mg)>D(Ni).

6. The multilayer ceramic electronic component as set forth in claim 4, wherein a content ratio of said R element in the grain boundary is set to D(R), D(Mg), said D(Si), said D(Ni) and said D(R) satisfy a relation of D(R)>D(Si)>D(Mg)>D(Ni).

7. The multilayer ceramic electronic component as set forth in claim 1, wherein an average value of a thickness of said grain boundary is 0.3 to 0.9 nm, and a deviation of the thickness of said grain boundary is 25 or less in C.V. value.

8. The multilayer ceramic electronic component as set forth in claim 1, wherein a segregation area having different composition than said dielectric particle is present in said dielectric layer, and at a cross section of said element body cut by a vertical plane to the dielectric layer and the internal electrode layer, a ratio of an area occupied by said segregation area with respect to an area of the cross section is 0.1 to 5.0%.

9. The multilayer ceramic electronic component as set forth in claim 8, wherein said segregation area substantially consists of a composite oxide of said Mg and said Si.

10. The multilayer ceramic electronic component as set forth in claim 8, wherein among said segregation areas, the number of a segregation area which contacts with said internal electrode layer is 20 to 100%.

11. The multilayer ceramic electronic component as set forth in claim 8, wherein said element body comprises an electrode missing portion where said internal electrode layer is not formed in the area that said internal electrode layer should be formed, and said segregation area is present in at least part of said electrode missing portion.

* * * * *